May 28, 1957
W. HESS ET AL
2,793,907
VERTICALLY SWINGABLE STATION-WAGON
TAIL-GATE WITH RETRACTIBLE WINDOW
Filed July 14, 1954
4 Sheets-Sheet 2
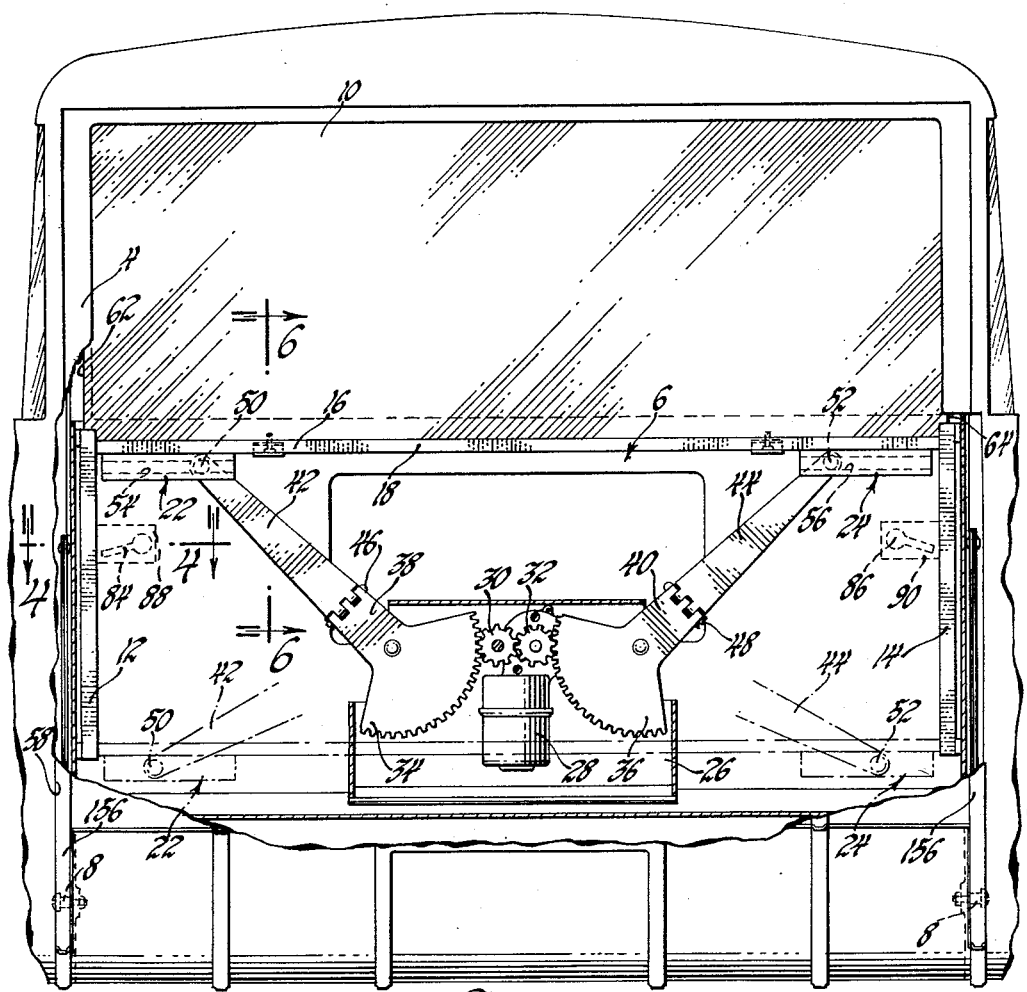
INVENTORS
William Hess,
Rudolph Potocnik &
BY Frederick C. Walther
Paul Fitzpatrick
ATTORNEY

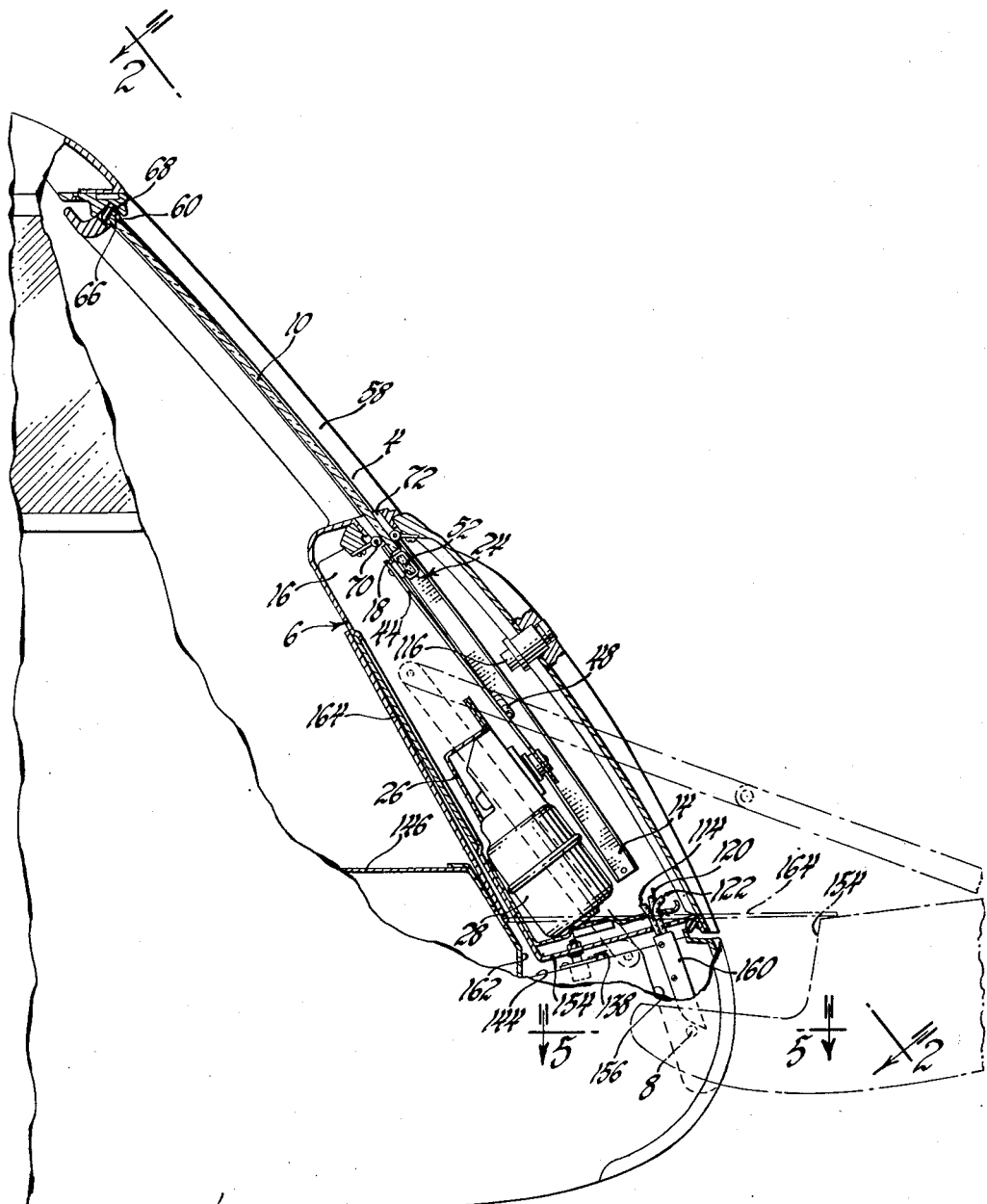

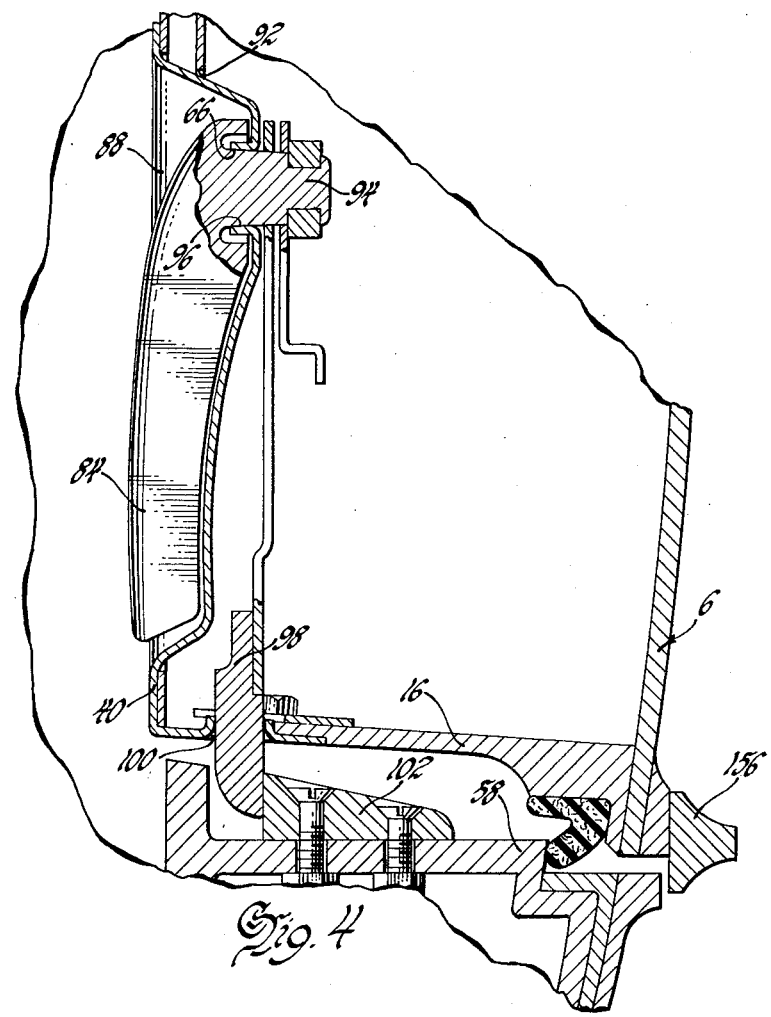
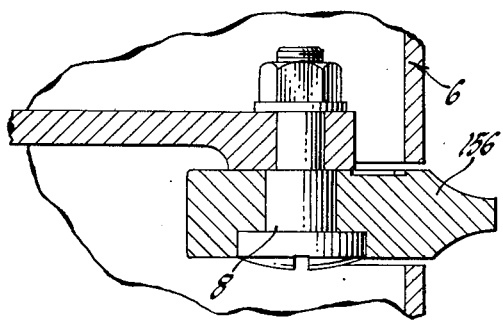

May 28, 1957 W. HESS ET AL 2,793,907
VERTICALLY SWINGABLE STATION-WAGON
TAIL-GATE WITH RETRACTIBLE WINDOW
Filed July 14, 1954 4 Sheets-Sheet 4

INVENTORS
William Hess,
Rudolph Pococnik &
BY Frederick C. Walther
Paul Fitzpatrick
ATTORNEY ns Patent Office
2,793,907
Patented May 28, 1957

2,793,907

VERTICALLY SWINGABLE STATION-WAGON TAIL-GATE WITH RETRACTIBLE WINDOW

William Hess, Birmingham, Rudolph Potocnik, Detroit, and Frederick C. Walther, Grosse Pointe, Mich., assignors to General Motors Corporation, Detroit, Mich., a corporation of Delaware Application July 14, 1954, Serial No. 443,238

7 Claims. (Cl. 296—106)

This invention relates to vehicle body closures and particularly to vertically swingable tail gates for station wagons.

Combination passenger and utility vehicles such as station wagons are commonly provided with vertically swingable tail gate structures which permit access to the interior of vehicles from the rear end thereof. Customarily, such tail gates or doors open outwardly and downwardly to provide a rearwardly extending platform which is substantially flush with the interior floor of the vehicle. Since it is desirable to provide the largest possible access opening to the vehicle, it is preferable that the rear window or back light of the vehicles also be displaceable. In the prior art it has been customary to provide a separate hinged window and frame assembly which is swingable upwardly and rearwardly independently of the tail gate, in order to prevent damage to the window when the tail gate is in the downward position. While these multiple door and window structures have been satisfactory insofar as providing the maximum opening and preventing breakage of the window, they require a large number of parts and are relatively difficult to operate.

An object of the present invention is to provide a vehicle body construction having a unitary rear window and tail gate structure providing access to the interior.

Another object is to provide a unitary rear window and tail gate structure wherein the window portion is protected against damage when the tail gate is in the down position.

A further object is to provide a combination tail gate and window structure wherein the window and tail gate are sequentially operated.

Yet another object is to provide a vertically swingable tail gate structure having a retractible rear window, wherein means are provided to prevent operation of the tail gate until the window is fully retracted in the tail gate.

Yet another object is to provide a structure of the type described having means for preventing operation of the window when the tail gate is in the down position.

Still a further object is to provide a tail gate structure of the stated character having automatic bridging means for eliminating the longitudinal gap between the vehicle floor and the upper surface of the tail gate when the latter is in open position.

These and other objects and advantages of the invention will become more fully apparent as reference is had to the following specification and drawings wherein:

Fig. 1 is a fragmentary side elevational view of the rear portion of a vehicle partly in section and with parts broken away to more clearly illustrate the structure and arrangement of the invention.

Fig. 2 is a rear plan view partly in section and with parts broken away, looking in the direction of arrows 2—2 of Fig. 1.

Fig. 3 is an enlarged fragmentary sectional view illustrating the form and arrangement of a safety switch mechanism.

Fig. 4 is an enlarged fragmentary plan view looking in the direction of arrows 4—4 of Fig. 2.

Fig. 5 is an enlarged fragmentary plan view partly in section looking in the direction of arrows 5—5 of Fig. 1.

Figure 6:
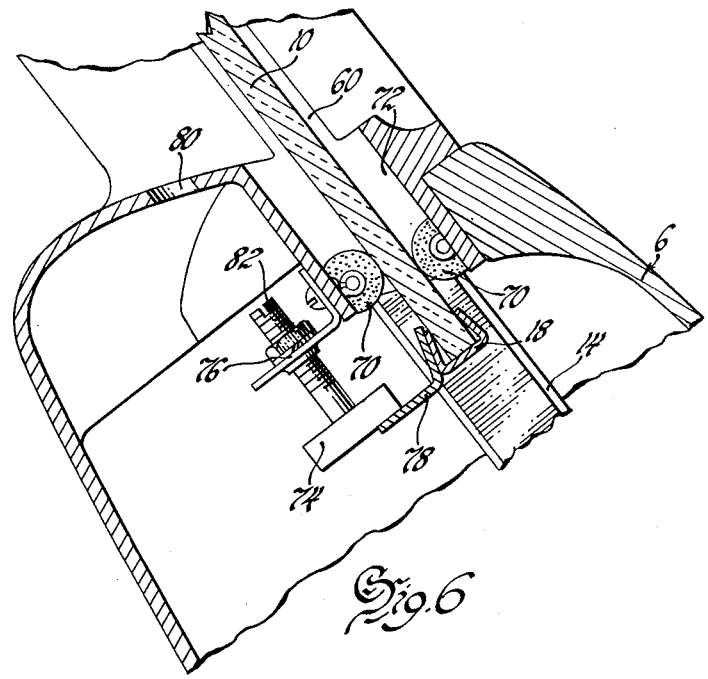
Fig. 6 is an enlarged fragmentary elevational view of a portion of the structure shown in Fig. 1.

Referring now to the drawings and particularly Figs. 1 and 2, there is illustrated the rear body portion 2 of a station wagon or utility vehicle. At the rear end thereof, the body portion 2 is provided with a large rectangular opening 4. At its lower edge, a door 6 is hingedly mounted to the vehicle body 2 adjacent the lower horizontal edge of opening 4 by means of a plurality of transversely aligned hinges 8. In the closed position, tail gate 6 occupies the lower half of rectangular opening 4. A generally rectangular rear window or back light 10 is mounted for vertical slidable movement along a pair of laterally spaced generally U-shaped channel members 12 and 14 which are, in turn, mounted on the opposite inner surfaces of end walls 16 of door 6. At its lower edge, back light 10 is secured to a channel-like supporting member 18. Attached to the lower edge of the frame are a pair of laterally spaced apart relatively short U-shaped channel members 22 and 24, the purpose of which will be described presently. Mounted centrally on a bracket 26 secured in the interior of tail gate 6 is a remotely energized reversible electrical motor 28 to which are operatively connected a pair of cooperating pinions 30 and 32. Pinions 30 and 32, respectively, operatively engage laterally spaced pivotally mounted gear segments 34 and 36. Gear segments 34 and 36 are provided with short extended portions 38 and 40 to which are connected relatively long window drive arms 42 and 44 by transverse hinge connections 46 and 48. At their terminal extremities, arms 42 and 44 are provided with rollers 50 and 52 which slidably cooperate with the slots 54 and 56 formed by channel members 22 and 24, previously mentioned. It will be apparent that when the electric motor 28 rotates in one direction, pinions 30 and 32 will rotate in opposite directions and actuate gear segments 34 and 36 and their respective drive arms 42 and 44 through reversely similar arcs. Thus, the terminal ends of arms 42 and 44 will travel in unison from the vertical level shown in Fig. 2 to the vertical level shown in dotted lines in Fig. 2. Since rollers 50 and 52 operatively engage channels 22 and 24, the window 10 will be driven downwardly from the position shown in Fig. 2 until fully recessed within the tail gate door 6. Upon reversal of electric motor 28, the mechanism operates in an identical manner, but in the reversed sense, to extend the window to the raised position. As pointed out previously, arms 42 and 44 are hinged to segments 38 and 40. Thus, the arms are rigid with respect to the segments in a transverse plane but are capable of swinging longitudinally to compensate for slight misalignment of the gear sectors with respect to the plane of the window.

As seen best in Figs. 1 and 2, the marginal surface 58 of the upper portion of the rectangular opening 4 in vehicle body 2 is stepped inwardly to provide a generally U-shaped channel or perimetral recess 60 which slightly overlaps the side edges 62 and 64 and top edge 66 of the window when the latter is in the raised position. In order to prevent drafts and leakage around the edges and top of the window, edges 62, 64 and 66 are provided with a U-shaped weather stripping 68. To assure free sliding action of window 10, a plurality of resilient rollers 70 are mounted interiorly of door 6 adjacent to transverse slot 72 through which window 10 extends.

To control the extended height of window 10, there is provided an adjustable stop member 74 which is threadably disposed in a bracket 76 secured on the inner surface of inwardly flanged transverse slot 72 of door 6. An abutment plate 78 secured to channel member 18 engages stop 74 when the window is raised to occupy the upper portion of opening 4. A small aperture 80 formed in the top of door 6 provides access to the slotted end 82 of stop 74 to permit the slight adjustment required to regulate the maximum height of window 10.

As will be apparent from Fig. 2, when window 10 is in the raised position, downward swinging movement of the tail gate 6 and window 10 is prevented by the channel 60 overlapping the edges of the window. Thus, it is assured that the tail gate will not be lowered while the glass 10 is in the extended position, and any possibility of glass breakage is eliminated. In order to prevent forcible opening of tail gate 6 when the window 10 is in the up position, the handles 84 and 86 of manually operable tail gate door latches 88 and 90 are mounted on the inner surface of the door 6 and are, therefore, inaccessible from outside the vehicle except when the window 10 has been lowered to its recessed position within the door. Since latches 88 and 90 are of conventional construction and form no part of the invention, the details of construction have been omitted.

As seen best in Fig. 4, the operating handles 84 and 86 of latches 88 and 90 are disposed in recesses 92 formed in the front surface of door 6. Formed integrally at one end of each operating handle 84 and 86 are pivot studs 94. Studs 94 extend through apertures 96 into the interior of door 6 and operatively engage sliding bolt members 98 which are laterally slidable responsive to swinging movement of handles 84 and 86. The terminal ends of bolts 98 extend outwardly through openings 100 in end walls 16 of door 6 to engage stop plates 102 which are adjustably secured on the marginal surface 58 of opening 4.

Figure 7:
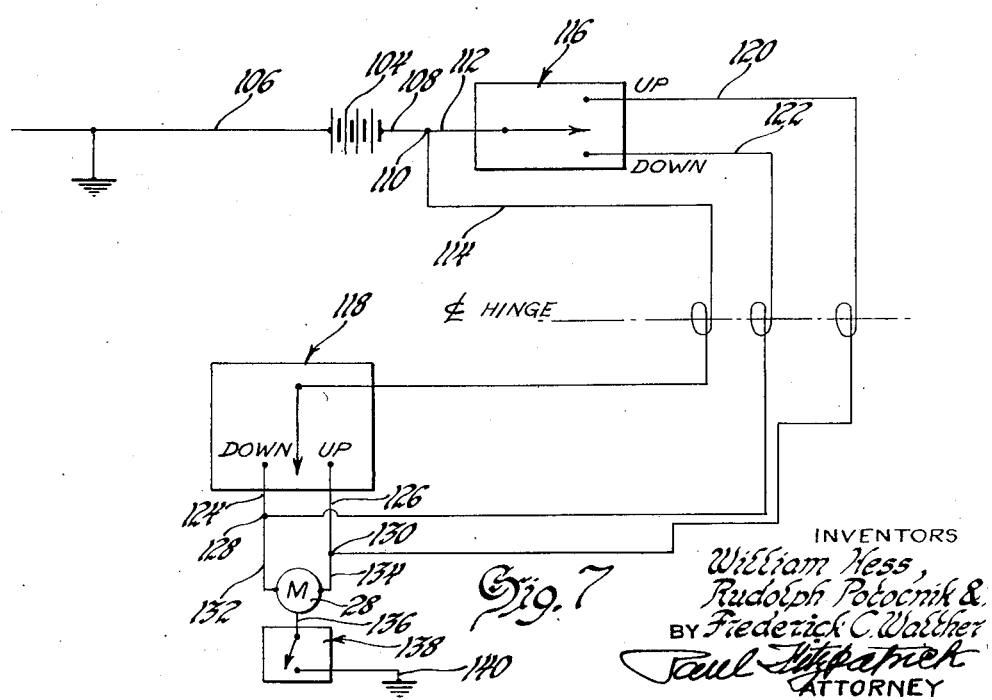
Fig. 7 is a schematic diagram of the electrical control circuit of the invention.

In order to operate rear window 10 and permit access to latches 88 and 90, the electric motor 28 is connected to a source of current in the manner shown schematically in Fig. 7. As seen in Fig. 7, the numeral 104 indicates a source of electrical energy which is connected to ground by conductor 106. A second conductor 108 extends between 104 and junction 110. From junction 110 current passes through conductors 112 and 114 to remote control switches 116 and 118. Switches 116 and 118 are positioned, respectively, on the vehicle instrument panel, not shown, and on the rear wall of tail gate 6. Each switch 116 and 118 is of the type having a central neutral position and motor energizing positions at either side of the neutral position which respectively energize the motor 28 for rotation in opposite directions. Since motor 28 is intended for operation responsive to energization by either control switch 116 or 118, each switch is connected to a pair of conductors 120 and 122 and 124 and 126, respectively. At junctions 128 and 130, conductor 120 and 124 and conductors 122 and 126 are interconnected respectively to conductors 132 and 134 which, in turn, are connected to motor 28. A ground 136 is connected at one end to motor 28 and at its opposite end engages a jam switch 138, which, in turn, is connected to ground by conductor 140.

As seen best in Figs. 1 and 3, the casing 142 of jam switch 138 is secured in the stepped portion 144 of vehicle floor 146. An upwardly spring urged plunger 148 is disposed in casing 142 and at its lower end is connected to ground by conductor 140. At its upper end, plunger 148 is formed with an enlarged end 150 which is adapted to engage a cooperating fixed contact 152 secured in the lower wall 154 of door 6. Since the contact 152 is carried by door 6, it will be apparent that the ground connection to the motor 28 is effective only when the tail gate 6 is in the closed position. Consequently, when tail gate 6 is in the extended position shown in Fig. 1, jam switch 138 is open and motor 28 is, therefore, rendered inoperative. It will now be seen that the required sequence of operation of the rear window and tail gate eliminates any possibility of inadvertently lowering the tail gate while the window is in the up position or subsequently extending the window when the tail gate is in the down position.

As previously mentioned, provisions are made for operating the rear window from either of two remote control points, 116 and 118. Since switch 118 is disposed in the tail gate 6, it is necessary that current carrying conductors extend between the body 2 and the tail gate 6. It is, therefore, desirable that these wires not only be protected, but also that they be subjected to a minimum of flexing during raising and lowering of the tail gate. Accordingly, hinge element 156 secured to the door 6 is formed with a suitable channel through which conductors 114, 120 and 122 extend. A cover plate 160, secured over the side of hinge element 156 retains conductors 114, 120 and 122 in position. Because of the scale of the drawing in Fig. 1, only the portion of conductors 114, 120 and 122 extending through hinge element 156 are shown. It will be understood, however, that these conductors are intended for connection to switch 116 and motor 28.

As seen in Fig. 1, the pivotal axis of door 6 is considerably below and behind the rear edge of the floor 146 of body 2. Consequently, upon lowering of door 6 to the extended position, there is occasioned a substantial longitudinal gap between the rear edge 162 of floor 146 and the lower wall 154 of door 6. To eliminate this gap, there is provided a transversely extending plate member 164 which is pivotally secured along the rear edge 162 of floor 146. Plate 164 normally extends upwardly in a plane adjacent to and parallel with the inner surface of door 6 and is spring urged to cause downward and rearward swinging movement as the door 6 is lowered to extended position. Thus, the plate member 164 swingably follows door 6 to automatically bridge the gap previously referred to. Upon return of door 6 to closed position, plate member 164 is cammed upwardly to the position shown in Fig. 1.

From the foregoing, it will be seen that a novel and highly efficient station wagon tail gate structure has been provided. The construction not only eliminates a large number of parts heretofore required in similar structures, but also assures freedom from inadvertent or intentional damage to the window resulting from extending the same when the tail gate is in the horizontally extended open position.

While but one embodiment of the invention has been shown and described, it will be apparent that other changes and modifications may be made therein without departing from the invention. It is, therefore, to be understood that it is not intended to limit the invention to the embodiment shown but only by the scope of the claims which follow.

We claim:

1. In a vehicle body having an opening in the rear end thereof, a closure member hinged at the lower edge thereof and swingable from the horizontally extending open position to a vertically extending closed position occupying the lower half of said opening, means forming a perimetral channel in said opening, a window slidably mounted in said closure, and means for raising said window to occupy the upper half of said opening, said window being of such dimension that an edge portion thereof occupies said channel.

2. In a vehicle body having an opening therein, a door hinged to said body for swinging movement for an open horizontally extending position to a closed vertically extending position occupying a portion of said opening, a window movable from a recessed position in said door to an extended position occupying the remainder of said opening, means formed in said body overlapping the edges of said window when the latter is in raised position and effective thereby to prevent movement of said door to open position, window actuating means operative to move said window to recessed position, remote control means for said actuating means, and means responsive to opening of said door for rendering said remote control means inoperative.

3. In a vehicle body having an opening therein, a door hinged to said body for swinging movement from an open horizontally extending position to a closed vertically extending position occupying a portion of said opening, a window movable from a recessed position in said door to an extended position occupying the remainder of said opening, means formed in said body overlapping the edges of said window when the latter is in raised position and effective thereby to prevent movement of said door to open position, window actuating means operative to move said window to recessed position, remote control means for said actuating means, and means for preventing movement of said window to extended position when said door is in open position, said means comprising switch means effective to render said remote control means inoperative.

4. In a vehicle body having an opening therein, a door hinged to said body for swinging movement from an open horizontally extending position to a closed vertically extending position occupying a portion of said opening, a window movable from a recessed position in said door to an extended position occupying the remainder of said opening, means formed in said body overlapping the edges of said window when the latter is in raised position and effective thereby to prevent movement of said door to open position, power operated means for actuating said window to its respective raised and lowered positions, remotely disposed means for energizing said power operated means, and means effective upon opening of said door to prevent energization of said power operated means by said remotely disposed means.

5. In a vehicle body having an opening therein, a door hinged to said body for swinging movement from an open horizontally extending position to a closed vertically extending position occupying a portion of said opening, a window movable from a recessed position in said door to an extended position occupying the remainder of said opening, means formed in said body overlapping the edges of said window when the latter is in raised position and effective thereby to prevent movement of said door to open position, an electric window operating mechanism for raising and lowering said window, remotely disposed control means for energizing said electric mechanism, and circuit breaking means effective upon opening of said door to prevent energization of said electric mechanism.

6. The structure set forth in claim 5 wherein said circuit breaking means comprises compression contacts mounted in said body for yieldable engagement with said door when the latter is in closed position.

7. In a vehicle body having an opening therein, a door hinged to said body for swinging movement from an open horizontally extending position to a closed vertically extending position occupying a portion of said opening, a window movable from a recessed position in said door to an extended position occupying the remainder of said opening, means formed in said body overlapping the edges of said window when the latter is in raised position and effective thereby to prevent movement of said door to open position, an electric motor operative to actuate said window to its respective raised and lowered positions, a source of current, a circuit connecting said motor with said source of current, switch means effective to open and close said circuit, and additional means effective upon opening of said door to disconnect said circuit whereby said motor is rendered inoperative when said door is in open position.

References Cited in the file of this patent
UNITED STATES PATENTS

| | | |
|---|---|---|
| 2,628,860 | Darrin | Feb. 17, 1953 |
| 2,658,792 | Scott | Nov. 10, 1953 |